(12) United States Patent
Runge et al.

(10) Patent No.: US 11,679,953 B2
(45) Date of Patent: Jun. 20, 2023

(54) POWER CABLE ARRANGEMENT FOR OFFSHORE WIND FARMS (71) Applicants: Jörn Runge, Marklohe (DE); Daniel Bartminn, Elmshorn (DE)

(72) Inventors: Jörn Runge, Marklohe (DE); Daniel Bartminn, Elmshorn (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 17/574,335

(22) Filed: Jan. 12, 2022

(65) Prior Publication Data
US 2022/0135363 A1 May 5, 2022

Related U.S. Application Data (63) Continuation of application No. PCT/EP2020/065348, filed on Jun. 3, 2020.

(30) Foreign Application Priority Data

Jul. 24, 2019 (DE) ..................... 10 2019 119 967.0

(51) Int. Cl.
| | |
|---|---|
| B65H 49/18 | (2006.01) |
| F03D 13/25 | (2016.01) |
| F03D 80/80 | (2016.01) |
| B65H 55/04 | (2006.01) |
| B65H 57/00 | (2006.01) |
| H02G 1/10 | (2006.01) |
| H02G 9/12 | (2006.01) |
| H02G 11/02 | (2006.01) |

(52) U.S. Cl.
CPC ............. *B65H 49/18* (2013.01); *B65H 55/04* (2013.01); *B65H 57/00* (2013.01); *F03D 13/25* (2016.05); *F03D 80/85* (2016.05); *H02G 1/10* (2013.01); *H02G 9/12* (2013.01); *H02G 11/02* (2013.01); *B65H 2701/34* (2013.01); *F05B 2230/60* (2013.01)

(58) Field of Classification Search
CPC ........ B65H 49/18; B65H 55/04; B65H 57/00; B65H 2701/34; F03D 13/25; F03D 80/85; H02G 1/10; H02G 9/12; H02G 11/02; F05B 2230/60
See application file for complete search history.

(56) References Cited

U.S. PATENT DOCUMENTS

| 5,971,665 A | 10/1999 | Hughes | |
|---|---|---|---|
| 6,416,005 B1 * | 7/2002 | Liao | B65H 75/4449 242/532.5 |

(Continued)

FOREIGN PATENT DOCUMENTS

| DE | 10 2012 017 379 A1 | 3/2014 |
|---|---|---|
| KR | 101 214 298 B1 | 12/2012 |

*Primary Examiner* — Aaron R Eastman
(74) *Attorney, Agent, or Firm* — Reinhart Boerner Van Deuren P.C.

(57) ABSTRACT

A power cable arrangement, in particular marine power cable, for offshore wind farms, including at least one cable drum device with a cable drum. The power cable arrangement includes at least one power cable wound on the cable drum with at least one cable end configured to pre-installing at a cable connection of a wind energy device. The power cable is wound on the cable drum such that a first section of the power cable is wound inversely to a further section of the power cable.

21 Claims, 8 Drawing Sheets (56) References Cited

U.S. PATENT DOCUMENTS

| | | | |
|---|---|---|---|
| 2005/0178871 A1* | 8/2005 | Liao | B65H 75/4434 |
| | | | 242/378.1 |
| 2006/0138268 A1* | 6/2006 | Huang | H02G 11/02 |
| | | | 242/378.1 |
| 2009/0107789 A1* | 4/2009 | Huang | H01R 13/72 |
| | | | 191/12.4 |
| 2011/0003503 A1* | 1/2011 | Lin | H02G 11/02 |
| | | | 439/501 |
| 2011/0061314 A1 | 3/2011 | Mühlhäuser | |
| 2011/0061982 A1* | 3/2011 | Cheng | H02G 11/02 |
| | | | 191/12.2 R |
| 2012/0134752 A1 | 5/2012 | Eisenhower et al. | |
| 2012/0312651 A1* | 12/2012 | Kramer | B65H 75/4434 |
| | | | 191/12.2 R |
| 2018/0030963 A1* | 2/2018 | Viselli | B63B 35/44 |
| 2020/0185900 A1* | 6/2020 | Theiss | B65H 75/4449 |

* cited by examiner

POWER CABLE ARRANGEMENT FOR OFFSHORE WIND FARMS

CROSS-REFERENCE TO RELATED PATENT APPLICATIONS

This patent application is a continuation of International Application No. PCT/EP2020/065348, filed on Jun. 3, 2020, which claims the benefit of priority to German Patent Application No. 10 2019 119 967.0, filed Jul. 24, 2019, the entire teachings and disclosures of both applications are incorporated herein by reference thereto.

FIELD OF THE INVENTION

The application relates to a power cable arrangement, in particular a submarine power cable arrangement, for offshore wind farms. Furthermore, the application relates to a wind energy system, in particular an offshore wind energy system, a cable drum device, a method for manufacturing a power cable arrangement and a method for installing an offshore wind farm.

BACKGROUND OF THE INVENTION

Wind farms with at least one wind turbine are increasingly used to provide electrical energy from so-called renewable energy sources. In particular, a wind turbine is configured to convert the kinetic wind energy into electrical energy. In order to increase the energy yield in such systems, wind farms are arranged respectively installed at locations with a high wind probability. In particular, offshore locations are usually characterized by relatively continuous wind conditions and high average wind speeds, so that so-called offshore wind farms are increasingly being installed.

Normally, an offshore wind farm comprises a plurality of offshore wind energy devices, such as a plurality of offshore wind turbines, measuring masts and/or at least one offshore substation, via which the offshore wind farm is electrically connected, for example, to an onshore substation or a further offshore substation and offshore converter station, respectively. An onshore substation, in turn, may be connected to a public power grid. In order to transmit electrical power between two offshore wind energy devices or an offshore wind energy device and an onshore energy device, power cables are laid in the form of submarine cables.

While it has been common practice for offshore wind farms to support an offshore wind energy device (in particular, a tower of an offshore wind energy device) by a foundation structure (e.g. monopile, tripod, tripile or jacket foundations) directly on the sea bottom, in particular a seabed, there have recently been increasing considerations to install floating offshore wind energy devices, for example floating offshore wind turbines, in order to install offshore wind farms, for example, in areas with a large water depth, for example, of more than 400 meters.

However, the installation of a floatable respectively floating offshore wind farm with a plurality of offshore wind energy devices turns out to be complex and enormously costly. In particular, the effort required for the laying, the pulling in and the terminating and connecting, respectively, of the power cables of the inner-park cabling is complex and involves correspondingly high costs. For example, the cabling and connecting are carried out using special vessels that employ complex techniques. The effort and complexity are, in particular, evident in the costs incurred, which, for example, amount to approx. 100 t€ per day for the laying vessel and the so-called service vessel alone (for e.g. the flushing-in process).

In order to reduce the effort and complexity and thus the costs, it is known from the prior art to use pre-installed power cables, in particular in the form of submarine power cables. In particular, pre-installation, for example in a port, reduces the number of error sources during terminating. Pre-installation means, in particular, that one cable end of a power cable is already mechanically and electrically coupled to a cable connection of the offshore wind turbine, i.e. terminated. However, the transport and, in particular, the subsequent laying of the already terminated power cable are problematic. In the state of the art, twisting around the longitudinal axis of the cable occurs time and again or, for example in the case of a conventional cable drum, unwinding and uncoiling, respectively, is completely prevented. Said twists can lead to a damage of the power cable.

BRIEF SUMMARY OF THE INVENTION

Therefore, the object of the application is to provide a possibility which allows an easier and at the same time safe laying of power cables, where at least one end is already pre-installed on an offshore wind energy device and, in particular, the risk of twisting of the power cable around the cable longitudinal axis is at least reduced.

The object is solved according to a first aspect of the application by a power cable arrangement, in particular a submarine power cable arrangement, for offshore wind farms, according to claim 1. The power cable arrangement comprises a cable drum device with at least one cable drum. The power cable arrangement comprises at least one power cable wound on the cable drum comprising at least one cable end configured to pre-install (the cable end) at a cable connection of a wind energy device. The power cable is wound on the cable drum such that a first section of the power cable is wound inversely to a further section of the power cable.

In contrast to the prior art, according to the application a possibility is provided which enables a simpler and at the same time safe laying of power cables, where at least one end is already pre-installed at an offshore wind energy device and, in particular, at least reduces the risk of twisting of the power cable around the cable longitudinal axis, by winding a power cable on the cable drum in such a way that a first section of the power cable is wound in opposite direction to a further section of the power cable.

The power cable arrangement comprises a cable drum device having a cable drum and a power cable wound thereon, in particular, in the form of a sea cable. Such a power cable may have a length of 1 km (and more). The length of a power cable corresponds, in particular, to the laying distance between two wind energy devices to be connected to each other (in addition, a specific length may be provided as a laying tolerance (e.g., at least 5 m)). The power cable is preferably a medium voltage cable (e.g., for voltages between 10 kV and 155 kV) or a high voltage cable (for voltages up to 5 kV).

A power cable comprises two cable ends. At least one cable end may be connected to a cable connection of a wind energy device when the power cable is pre-installed as intended. A pre-installation means, in particular, that one cable end of a power cable is already mechanically and electrically coupled to a cable connection of the offshore wind turbine, i.e. terminated. In a further preferred variant of the application, both ends of the power cable may be pre-installed, each to a cable connection of a respective wind energy device.

The cable drum device comprises at least one cable drum. In particular, the cable drum is formed in a cylindrical shape and is configured to allow the power cable to be wound onto the cable drum. The diameter of the cable drum can be large in such a way that the permissible bending radius of the power cable to be wound up is maintained. The cable drum device may be formed (exclusively) by the cable drum. Also, the cable drum device may comprise at least one further element, such as at least one supporting element (e.g. a turntable), and, for example, a cable drum is arranged on respectively at the further element, in particular, the supporting element.

In a wound-up state of the power cable arrangement according to the application, i.e. when the power cable (except for the ends and end regions, respectively) is (completely) wound up on the cable drum, a first section respectively a first partial length of the power cable is wound inversely to a further section respectively a further partial length of the power cable. This means, in particular, that during a winding process a first section of the power cable has been wound onto the cable drum with a first direction of rotation and winding direction, respectively, in a first winding step and the further section of the power cable has been wound onto the cable drum with a direction of rotation and winding direction, respectively, opposite to the first direction of rotation in a further winding step which is at least downstream of the first winding step. By a correspondingly inverse winding, the power cable can be unwound and uncoiled, respectively, from the cable drum without a (substantial) twisting occurring along the longitudinal cable axis of the power cable.

Preferably, the power cable can be formed (only) from the two sections (as well as the cable ends). Particularly preferably, the first section can have a length of about 50% of the total length of the power cable. Preferably, the length of the further section may have a length of about 50% of the total length of the power cable. In other words, the length ratio of the two sections may be substantially 50:50.

According to a preferred embodiment of the power cable arrangement according to the application, the cable drum device, in particular, the cable drum, may comprise at least one cable deflecting unit. The cable deflecting unit can be configured to deflect the power cable during winding onto the cable drum in such a way that the first section of the power cable is windable inversely to the further section of the power cable. In particular, a cable deflecting unit can be configured to guide and direct, respectively, the power cable in such a way that the winding direction is changed. In particular, the first section can first be wound in a first winding direction, then deflected via the cable deflecting unit, and then the further section can be (further) wound in a further winding direction that is inverse (opposite) to the first winding direction.

According to a particularly preferred embodiment of the power cable arrangement according to the application, the cable deflecting unit can be and/or comprise a substantially arcuate, in particular substantially semicircular, cable guide. A semicircular shape allows the power cable to be guided in a simple manner and, in particular, to be deflected by approximately 180° (at least between 150° and 210°). In a particularly simple manner, a previously described winding of the power cable in opposite directions can be carried out.

Preferably, the radius of an essentially semicircular cable guide can have a length such that the permissible bending radius of the power cable to be wound up is maintained. The same applies accordingly to an arcuate cable guide. According to an embodiment of the power cable arrangement according to the application, the radius of the substantially semicircular cable guide may be at least seven times larger than the diameter of the power cable. The same applies accordingly to an arcuate cable guide. Alternatively or additionally, the radius of the substantially semicircular cable guide may be at least greater than 50% of the cable drum radius, preferably at least greater than 75% of the cable drum radius, more preferably at least greater than 90% of the cable drum radius (and less than 100%). The same applies to an arcuate cable guide. Appropriately selected radii can ensure that a damage of the power cable is avoided in the event of a deflection. With radii at least greater than 75% of the cable drum radius, in particular preferably at least greater than 90% of the cable drum radius (and smaller than 100%), a particularly smooth deflection can take place.

In order to guide the power cable in a defined manner along the (outer) semicircular arc of the preferably substantially semicircular cable guide, the cable deflecting unit, preferably the arcuate cable guide, in particular, the substantially semicircular cable guide, can preferably have a U-profile, configured to guide the power cable. In particular, the distance between the legs of the U-profile may correspond to the outer diameter (possibly with a specific tolerance).

According to a further embodiment, the cable deflecting unit may be mounted to the cable drum device, preferably to the cable drum (indirectly or directly) in such a way that the substantially arcuate, in particular, substantially semicircular, cable guide runs in a plane parallel to the cable drum axis. In particular, the drum axis of the cylindrical cable drum extends in a vertical direction. Then the plane may be a vertical plane. If the drum axis runs in a horizontal direction, the plane may be a horizontal plane. Here, the intended state of the cable drum device is assumed, i.e. the state when in particular the power cable is wound up and the cable drum device is in a stable position.

For a particularly simple handling during the deflection, it is suggested that, according to this embodiment, the substantially arcuate, in particular semicircular, cable guide runs in a plane parallel to the cable drum axis, for example in a vertical plane, the power cable is thus deflected through approximately 180° in particular in a plane parallel to the cable drum axis. In other words, the cable deflecting unit may be oriented as far as possible in a plane parallel to the cable drum axis. It will be understood that in other variants of the application, the substantially semi-circular cable guide may (at least partially) extend in a plane angled with respect to the drum axis, for example in a horizontal plane (in other words, the cable deflecting unit may in this case be oriented substantially horizontally).

According to a further preferred embodiment of the power cable arrangement according to the application, the cable deflecting unit may be mounted to the cable drum device, in particular the cable drum (indirectly or directly), by means of a hinge mechanism. The hinge mechanism may be movable at least between a first position, in which the substantially arcuate, in particular substantially semicircular, cable guide extends in a plane parallel to the cable drum axis, and a second position, in which the substantially arcuate, in particular substantially semicircular, cable guide extends in a plane having an angle of at least 45° to the plane parallel to the cable drum axis, preferably of at least 75°, more preferably of substantially 90°. For example, the hinge mechanism may first move the substantially semi-circular cable guide in a horizontal plane (with respect to an exemplarily assumed vertically extending cable drum axis or drum axis) (corresponding to an angle of substantially 90° with respect to the vertical plane). In this second state, the first section can be wound up in a simple manner, in particular without the substantially semi-circular cable guide interfering with the winding. After the first section has been wound up, the hinge mechanism can move the substantially semicircular cable guide in the vertical plane. This allows that a deflection of the power cable can be carried out in order to perform a winding of the further section in the opposite direction. In a particularly simple manner, winding of two sections in opposite directions (as described above) can be carried out.

Preferably, the hinge mechanism can comprise a locking module configured to release and/or block a movement of the arcuate, in particular semicircular, cable guide. In a released position, the locking module, for example a fixing module (e.g. a brake unit), may allow a movement of the hinge mechanism respectively the cable guide mounted thereto between the first position and the second position respectively the positions described above. In a locked position, the locking module may block a movement of the hinge mechanism respectively the substantially semi-circular cable guide mounted thereto (particularly in the first position and in the second position). It shall be understood that further positions and locations, respectively, may be adjustable and in particular lockable.

According to a further particularly preferred embodiment of the power cable arrangement according to the application, the cable drum may comprise a first cable drum section and a second cable drum section, wherein the first cable drum section and the second cable drum section are freely turnable relative to each other. The first section of the power cable may be wound on the first cable drum section. The second section of the power cable may be wound on the second cable drum section. Unwinding of the power cable may be performed in a particularly simple and reliable manner. For example, the first section of the cable drum may first be unwound by turning the first cable drum section, and then the further section may be unwound by turning the second cable drum section (or vice versa, or both drum sections may be turned simultaneously (in opposite directions)). In particular, the cable drum may be formed of a central tube structure and two tube sections (e.g., in the form of two outer tubes) arranged one above the other in the longitudinal axis direction of the central tube structure (e.g., in the form of an inner tube) and freely rotatable relative to each other. The power cable may be wound around the two outer tubes such that it wounds around each tube with an opposite direction of rotation.

Preferably, the extension of the cable deflecting unit in a vertical direction may substantially correspond to the length of the extension of a cable drum section in the vertical direction. This further facilitates the winding process. In other words, the cable deflecting unit may be arranged such that the rotation direction transition can be completed between both drums. This arrangement, as has been described, allows the first partial length of power cable to be unwound first and then the further partial length of power cable to be unwound.

As has been already described, the power cable arrangement according to the application may be used for the installation of, in particular, an offshore wind farm, for example for the installation of a floatable offshore wind energy device. For example, the cable drum may be attached to a wind turbine or stored on a vessel that may transport both foundation elements of the offshore wind energy devices connected to the cable. Preferably, the power cable can be terminated onshore and/or in a port with each free end at a wind turbine. Subsequently, both wind turbines (respectively wind turbine substructures) comprising the cable drum can be transported to the location where the first wind turbine is to be installed. Once the first wind turbine has been installed, the second wind turbine can be moved to its destination position. In this case, the cable drum can be transported on a barge (or the like), which can move at e.g. a lower speed towards the installation location of the second wind turbine (unwinding the power cable during the movement).

According to a particularly preferred embodiment of the power cable arrangement according to the application, the cable drum device, in particular the cable drum, may be formed as a floatable cable drum device, in particular as a floatable cable drum. In particular, this means that the cable drum device comprises and/or forms at least one buoyant body. Here, a buoyant body respectively floating body means, in particular, an object which is independently buoyant due to its buoyancy by a displacement according to the Archimedes' principle. A buoyancy body may, for example, be at least partially hollow in its interior and/or filled with a light solid material. Additional means for a transport, such as an additional barge, may be omitted.

Preferably, a cable drum device may comprise a turntable (also referred to as a rotary plate) as a supporting element, on which the cable drum may be supported, in particular rotatably. The turntable (or another supporting element) and/or the cable drum may be floatable. Particularly preferably, the cable drum is configured such that it floats with the axis of rotation (or cable drum axis) parallel or vertical to the water surface. In particular, the power cable may be wound such that, when fully unwound, the cable drum device floats freely and, in particular, can be reused. In particular, the floating cable drum device is configured (e.g., by appropriate arrangement of buoyancy bodies and/or ballast material) to be tilt-stable under all unwinding conditions.

A further aspect of the application is a wind energy system, in particular an offshore wind energy system. The wind energy system comprises at least one wind energy device having at least one cable connection. The wind energy system comprises at least one previously described power cable arrangement, wherein a cable end of the power cable of the power cable arrangement is connected to the cable connection. In particular, this means that a pre-installed wind energy device, in particular an offshore wind energy device, can be provided.

A wind energy device according to the application may, in particular, be an offshore wind energy device (however, in principle, an onshore wind energy device is also conceivable, which may be coupled to an offshore wind energy device). Preferably, the wind energy device according to the application may be a floating offshore wind energy device, in particular a floating offshore wind turbine. An offshore wind energy device may comprise a generator that converts the kinetic energy of the wind into electrical energy. In particular, the generator may be located in a nacelle.

In particular, in a system according to the application, a wind energy device according to the application is in a pre-installed state in that at least one power cable end of at least one power cable is already mechanically and electrically coupled to a cable connection (e.g., a control cabinet) of the wind energy device, which is also referred to as terminated.

A further aspect of the application is a cable drum device for a submarine power cable. The cable drum device comprises a cable drum. The cable drum device comprises at least one cable deflecting unit configured to deflect the power cable during winding onto the cable drum such that the first section of the power cable can be wound inversely to the further section of the power cable.

The cable drum device is, in particular, a previously described cable drum device with, in particular, a previously described cable deflecting unit, which can be mounted directly or indirectly to the cable drum. Indirectly means in particular that both the cable drum and the cable deflecting unit may be arranged on a (common) supporting element or a further element.

A further aspect of the application is a method for manufacturing a power cable arrangement, in particular a previously described power cable arrangement. The method comprises:

winding a first section of a power cable onto a cable drum in a first direction of rotation in a first winding step, and winding a further section of the power cable onto the cable drum in a direction of rotation opposite to the first direction of rotation in a further winding step, which is at least downstream of the first winding step.

In the method, in particular the winding process, a first section of the power cable (of preferably at most two sections) is wound onto the cable drum with a first direction of rotation and winding direction, respectively, in a first winding step and then the further section of the power cable is wound onto the cable drum with a direction of rotation and winding direction, respectively, opposite to the first direction of rotation in a further winding step.

According to a preferred embodiment of the method according to the application, the method may comprise:

guiding the power cable via a cable deflecting unit mounted (directly or indirectly) to the cable drum between the first winding step and the further winding step.

As has been previously described, a deflection of the power cable can be accomplished in a simple manner using a previously described cable deflecting unit.

It shall be understood that a portion of the first section and/or a portion of the further section may/can run over the cable deflecting unit.

A still further aspect of the application is a method of installing an offshore wind farm comprising at least one offshore wind energy device. The method comprises:

connecting at least one cable end of a power cable of a previously described power cable arrangement to a cable connection of the at least one offshore wind energy device, transporting the offshore wind energy device together with the power cable arrangement to an installation position of the offshore wind energy device, and unwinding the power cable.

In particular, the method comprises a previously described pre-installing of an offshore wind energy device, wherein, for example in a port, at least one cable end of a power cable of a previously described power cable arrangement is mechanically and electrically coupled to a cable connection of the at least one offshore wind energy device. After the pre-installation, the (preferably floating) offshore wind energy device together with the (preferably floating) power cable arrangement can be transported, in particular towed, for example by a ship, to the installation site. At the installation site, the power cable can then be unwound in the previously described manner and, if the further cable end is not yet connected to a further wind energy device, in particular is not pre-installed, it can be connected to a cable connection of a further wind energy device.

The features of the power cable arrangements, wind energy systems, cable drum devices and methods can be freely combined with each other. In particular, features of the description and/or dependent claims may be independently inventive, even by completely or partially bypassing features of the independent claims, alone or freely combined with each other.

BRIEF DESCRIPTION OF THE DRAWINGS

There is now a multitude of possibilities for designing and further developing the power cable arrangement according to the application, the wind energy system according to the application, the cable drum device according to the application and the methods according to the application. For this purpose, reference is made on the one hand to the claims subordinate to the independent patent claims, and on the other hand to the description of embodiments in connection with the drawing. The drawing shows:

In the figures, the same reference signs are used for the same elements.

DETAILED DESCRIPTION OF THE INVENTION

Figure 1:
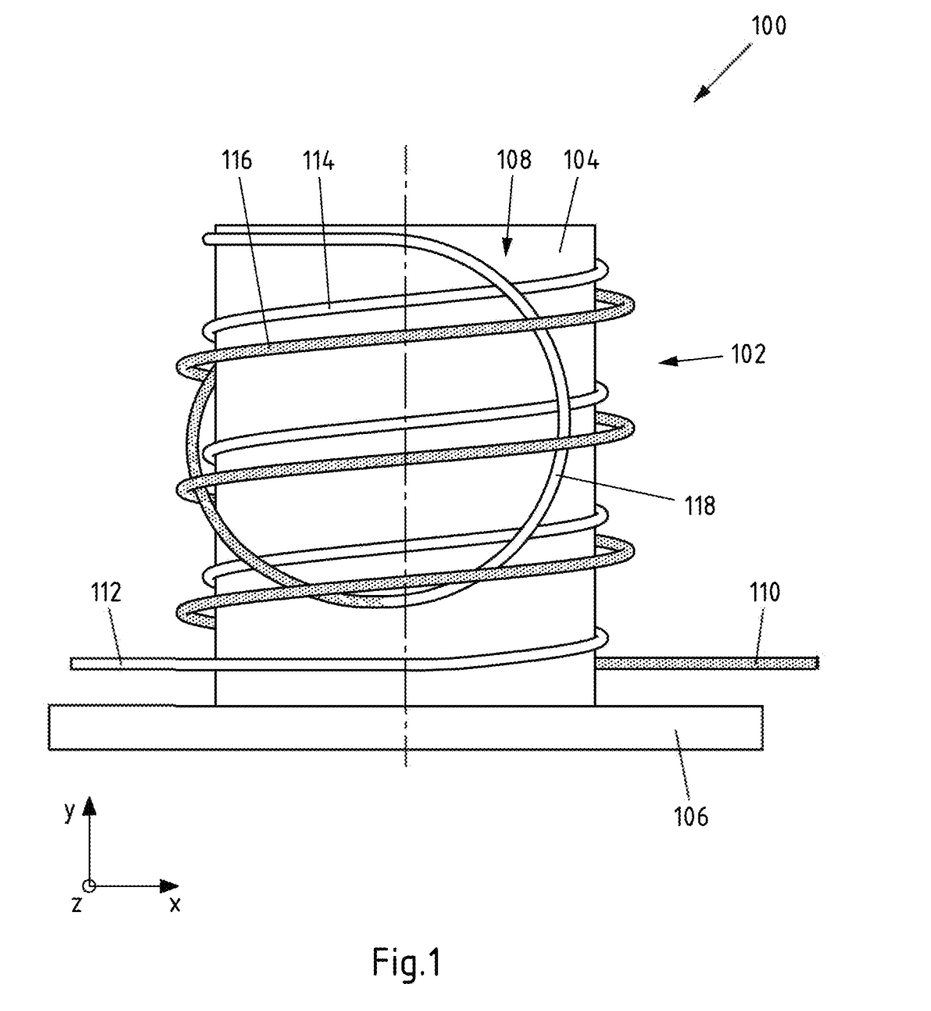
FIG. 1 a schematic view of an embodiment of a power cable arrangement according to the present application, FIG. 2a a schematic view of a further embodiment of a power cable arrangement according to the present application, FIG. 2b a further schematic view of the embodiment of a power cable arrangement according to FIG. 2a, FIG. 3a a schematic view of a further embodiment of a power cable arrangement according to the present application with a cable deflecting unit in a second position, FIG. 3b a further schematic view of the embodiment of a power cable arrangement according to FIG. 3a with the cable deflecting unit in a first position, FIG. 4 a schematic view of a further embodiment of a power cable arrangement according to the present application, FIG. 5 a schematic view of an embodiment of an offshore wind energy system according to the present application, FIG. 6 a diagram of an embodiment of a method according to the present application, and FIG. 7 a diagram of an embodiment of a further method according to the present application.

FIG. 1 shows a schematic view of an embodiment of a power cable arrangement 100 according to the present application comprising a cable drum device 102. In the present embodiment, the cable drum device 102 comprises a support member 106, for example in the form of a turntable 106, and a cable drum 104 supported thereon (for example rotatably).

Furthermore, a wound up power cable 108, in particular a submarine power cable 108, is shown. It should be noted here that only a small number of windings are shown for the sake of clarity. In practice, a power cable may have a length of, for example, one kilometer.

As can be seen, the power cable 108, preferably a medium voltage cable (e.g. for voltage between 10 kV and 155 kV) or a high voltage cable (for voltages up to 5 kV), comprises two (conventional) cable ends 110, 112. At least one cable end 110, 112, preferably both cable ends 110, 112, may be configured to pre-install the power cable 108 at a cable connection of a (not shown) wind energy device. Pre-installation means in particular that one cable end 110, 112 of the power cable 108 has already been mechanically and electrically coupled to a cable connection of the wind energy device, for example in a port, i.e. the cable has been terminated.

In the present embodiment, the power cable 108 is divided into two sub-parts 114 and 116. In other words, the illustrated power cable 108 comprises a first section 114 and a further respectively second section 116. Preferably, the two sections 114, 116 may be substantially equal in length. In particular, the total length of the power cable 108 corresponds to the laying distance between two wind energy devices to be connected.

The power cable 108 is wound on the cable drum 104 such that the first section 114 of the power cable 108 is wound in the opposite direction to the further section 116 of the power cable 108. In particular, a transition region 118 formed by a portion of the first section 114 and/or a portion of the further section 116 can be seen where the run of the power cable 108 is deflected by approximately 180°.

It should be noted that the cable drum axis (in the illustrated stable state of the cable drum device 102) extends in the y-direction. In the present example, the y-direction corresponds to the vertical direction.

Figure 2A:
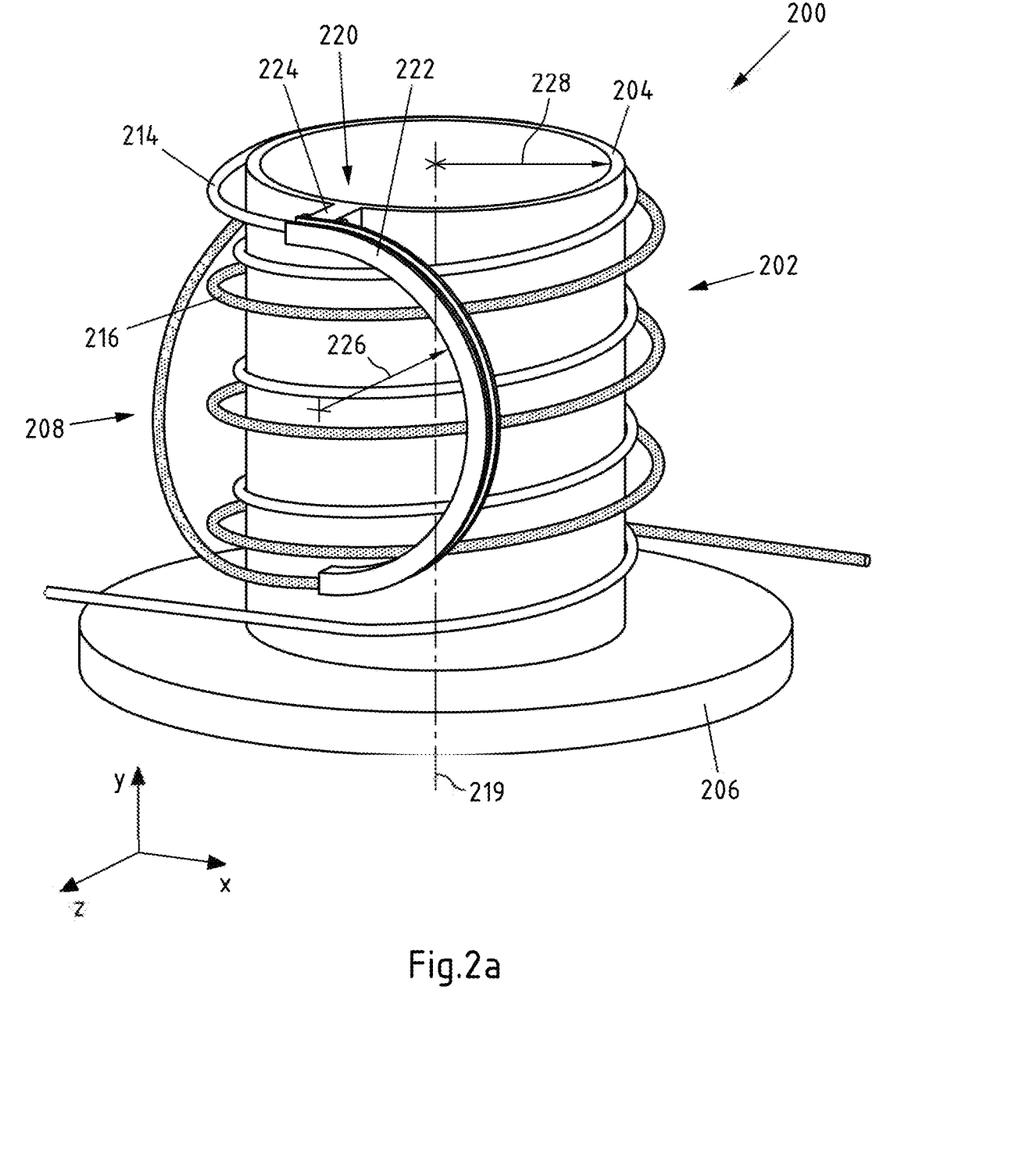
Figure 2B:
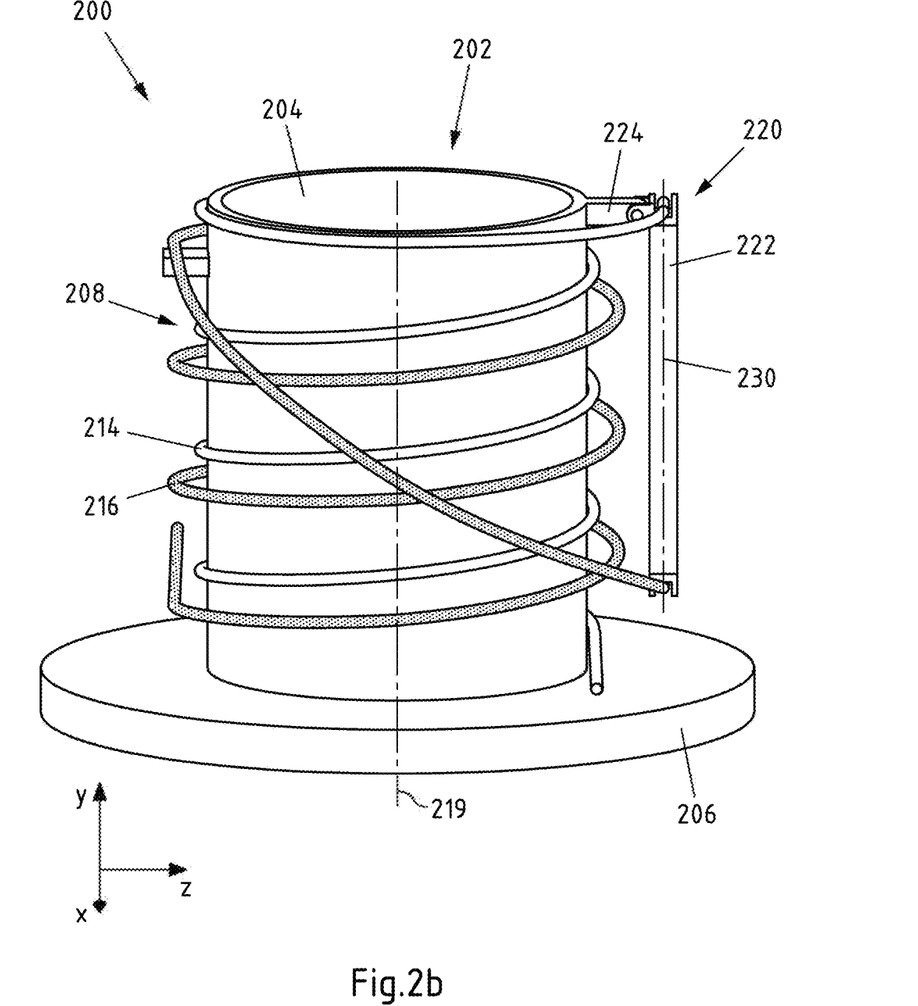

The FIGS. 2a and 2b show schematic views of a further embodiment of a power cable arrangement 200 according to the present application with an embodiment of a cable drum device 202 according to the present application. In order to avoid repetitions, substantially only the differences from the previous embodiment are described below, and otherwise reference is made to the previous embodiment.

In the present embodiment, the cable drum device 202 comprises at least one cable deflecting unit 220 configured to deflect the power cable 208 in such a way that the first section 214 of the power cable 208 is windable inversely to the further section 216 of the power cable 208. In the present case, the cable deflecting unit 220 comprises a substantially arcuate, preferably substantially semi-circular (e.g. between 150° and 210°) cable guide 222, which is mounted, in particular, via a connecting element 224 to the cable drum device 202, in the present case, in particular, directly to the cable drum 204. It shall be understood that, in other variants, the cable guide may also have other shapes, such as semi-oval shape, quarter-circular shape, etc.

In particular, the power cable 208 may be guided along the outer arc, which in particular, is in the form of a U-section, of the cable guide 222. As can be seen, the power cable 208 is deflected (in a plane parallel to the cable drum axis 219) by approximately 180°. By this, it can be achieved in a simple manner that in a winding process the power cable 208 can be wound onto the cable drum 204 in such a way that the first section 214 of the power cable 208 can be wound in the opposite direction to the further section 216 of the power cable 208.

As can be seen, the radius 226 of a substantially semi-circular cable guide 222 may be at least seven times larger than the diameter of the power cable 208. Alternatively or additionally, the radius 226 of a substantially semicircular cable guide 222 may be at least greater than 50% of the cable drum radius 228, preferably at least greater than 75% of the cable drum radius 228, more preferably at least greater than 90% of the cable drum radius 228.

The illustrated cable drum device 202 may be floatable. For example, at least one floating body may be integrated in and/or form the support element 206 and/or the cable drum 204.

Figure 3A:
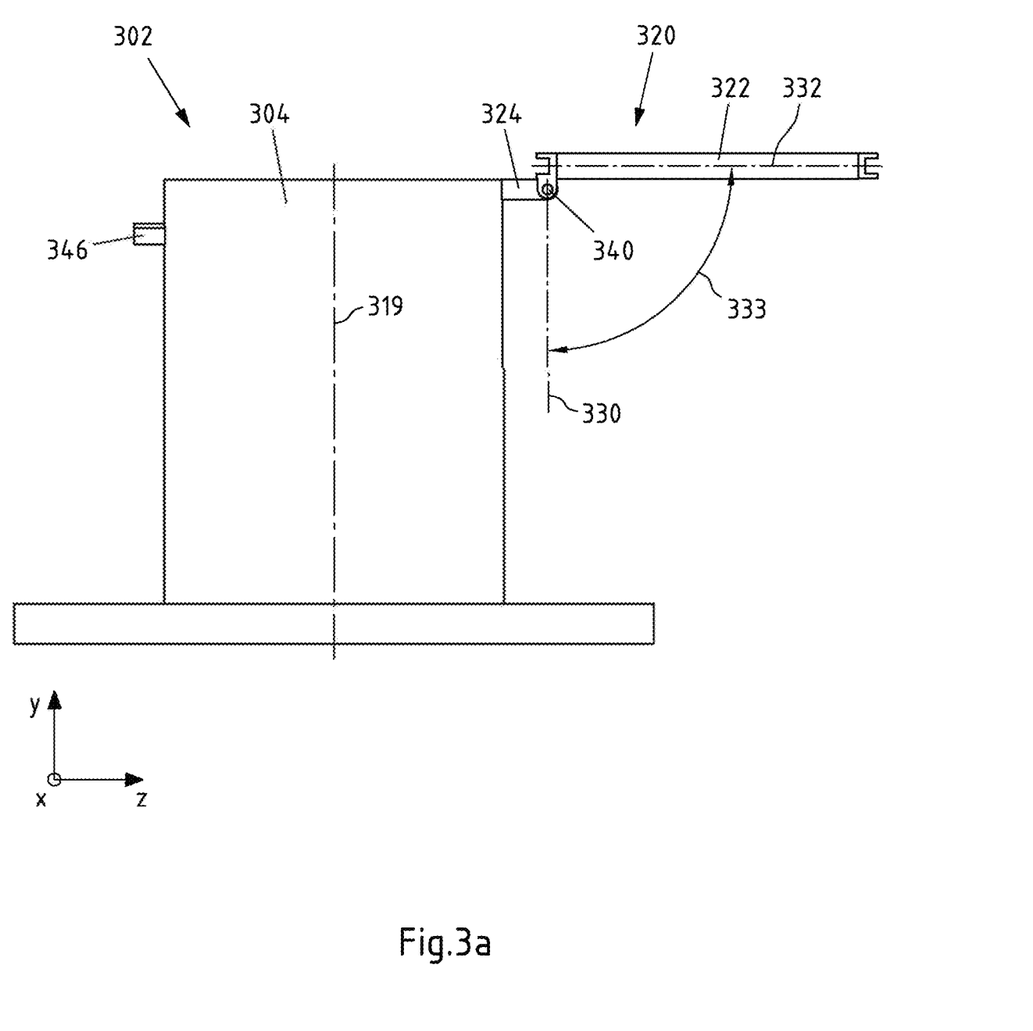
Figure 3B:
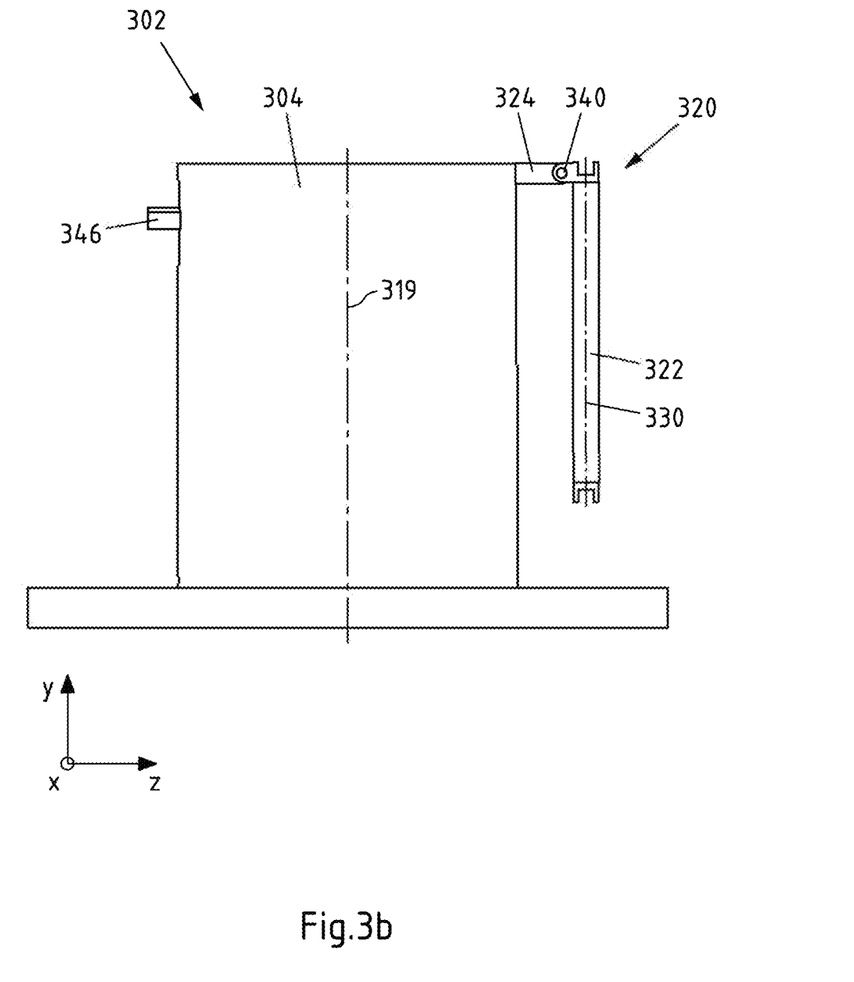

The FIGS. 3a and 3b show schematic views of a further embodiment of a power cable arrangement 300 according to the present application with an embodiment of a cable drum device 302 according to the present application. In order to avoid repetitions, substantially only the differences from the previous embodiments are described below, and otherwise reference is made to the previous embodiments. In addition, it should be noted that for the sake of clarity, a power cable is not shown.

In particular, the FIGS. 3a and 3b show a cable drum device 302 with a (foldable) cable deflecting unit 320 in a first position and location, respectively, and in a second position and location, respectively.

In order to be able to adjust the cable deflecting unit 320 between the at least two positions and location, respectively, the cable deflecting unit 320 comprises a hinge mechanism 340. In particular, the arcuate guide 322 is mounted to the cable drum device 302 via the hinge mechanism 340 (and presently via the connecting element 324, which may also be omitted). In the present case, the cable deflecting device 320 is directly or immediately attached to the cable drum 304.

In FIG. 3b, the cable deflecting unit 320 (and the hinge mechanism 340, respectively) is set or is located in the first position. In this first position, the arcuate cable guide 322 is located in a plane 330 (in this case, a vertical plane 330) parallel to the cable drum axis 319. In this position, a power cable can be deflected in a particularly simple manner, as previously described. Moreover, this position is also advantageous during transportation (with or without a power cable), since the cable drum device 302 is formed compactly in this position.

From this first position, the cable deflecting unit 320 (and the hinge mechanism 340, respectively) can be set into a second position. In particular, the cable deflecting unit 320 and the hinge mechanism 340, respectively, is movable into the second position in which the substantially arcuate, in particular substantially semicircular, cable guide 322 extends in a plane 332 having an angle 333 of at least 45° to the plane 330 extending parallel to the cable drum axis 319, preferably of at least 75°, in particular preferably of substantially 90°, as exemplified shown in FIG. 3a.

In particular, in this position the cable deflecting unit 320 is folded away from the circumferential drum wall. The advantage of this position is that the winding of the power cable, in particular, of the first section, is not, or at least hardly, affected by the cable deflecting unit 320. The winding process can be facilitated.

Furthermore, advantageously, at least one cable holder 346 is arranged on the cable drum 304 in the upper half of the cable drum 304 in order to be able to hold (and in particular guide) the deflected power cable 308 into the upper region of the cable drum 304.

Figure 4:
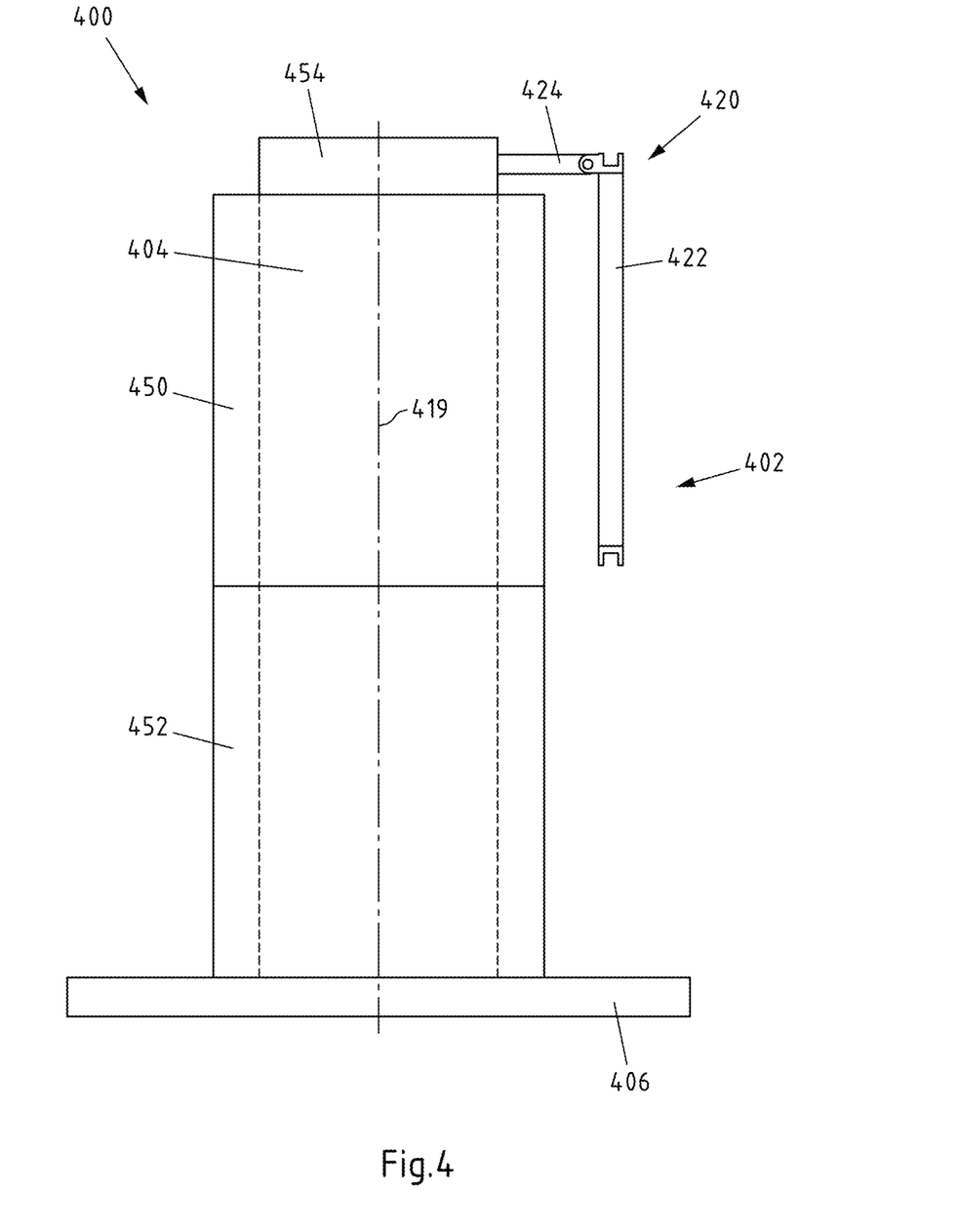

The FIG. 4 shows a schematic view of a further embodiment of a power cable arrangement 400 according to the present application with an embodiment of a cable drum device 402 according to the present application. In order to avoid repetitions, substantially only the differences from the previous embodiments are described below, and otherwise reference is made to the previous embodiments. In addition, it should be noted that for the sake of clarity, a power cable is not shown.

The illustrated cable drum 404 comprises a first cable drum section 450 and a second respectively further cable drum section 452, wherein the first and second cable drum sections 450, 452 are freely rotatable relative to each other. The first section of the power cable may be wound on the first cable drum section 450. The second section of the power cable may be wound on the second cable drum section 452.

In a particularly simple and reliable manner, unwinding of the power cable may be performed. For example, first the first section can be unwound by turning the first cable drum section 450 and then the further section can be unwound by turning the second cable drum section 452 (or vice versa). Simultaneous turning of the cable drum sections 450, 452 may also be performed.

In particular, the cable drum 404 may be formed by a central tube structure 454 and two tube sections 450, 452 (e.g., in the form of two outer tubes 450, 452) arranged one above the other in the longitudinal axis direction 419 of the central tube structure 454 (e.g., in the form of an inner tube 454), which may be freely turned relative to each other. The power cable may be wound around the two outer tubes 450, 452 such that it winds around each tube 450, 452 with an opposite direction of rotation.

Furthermore, a cable deflecting unit 420, for example according to FIG. 2 or FIG. 3, is arranged. In the present embodiment, the cable deflecting unit 420 is attached to the central tube structure 454.

Preferably, the extension of the cable deflecting unit 420 in a direction along the cable drum axis 419 may substantially correspond to the length of the extension of a cable drum section 450, 452 (presently the first cable drum section 450) in the y-direction (presently the vertical direction). This further facilitates the winding process.

Figure 5:
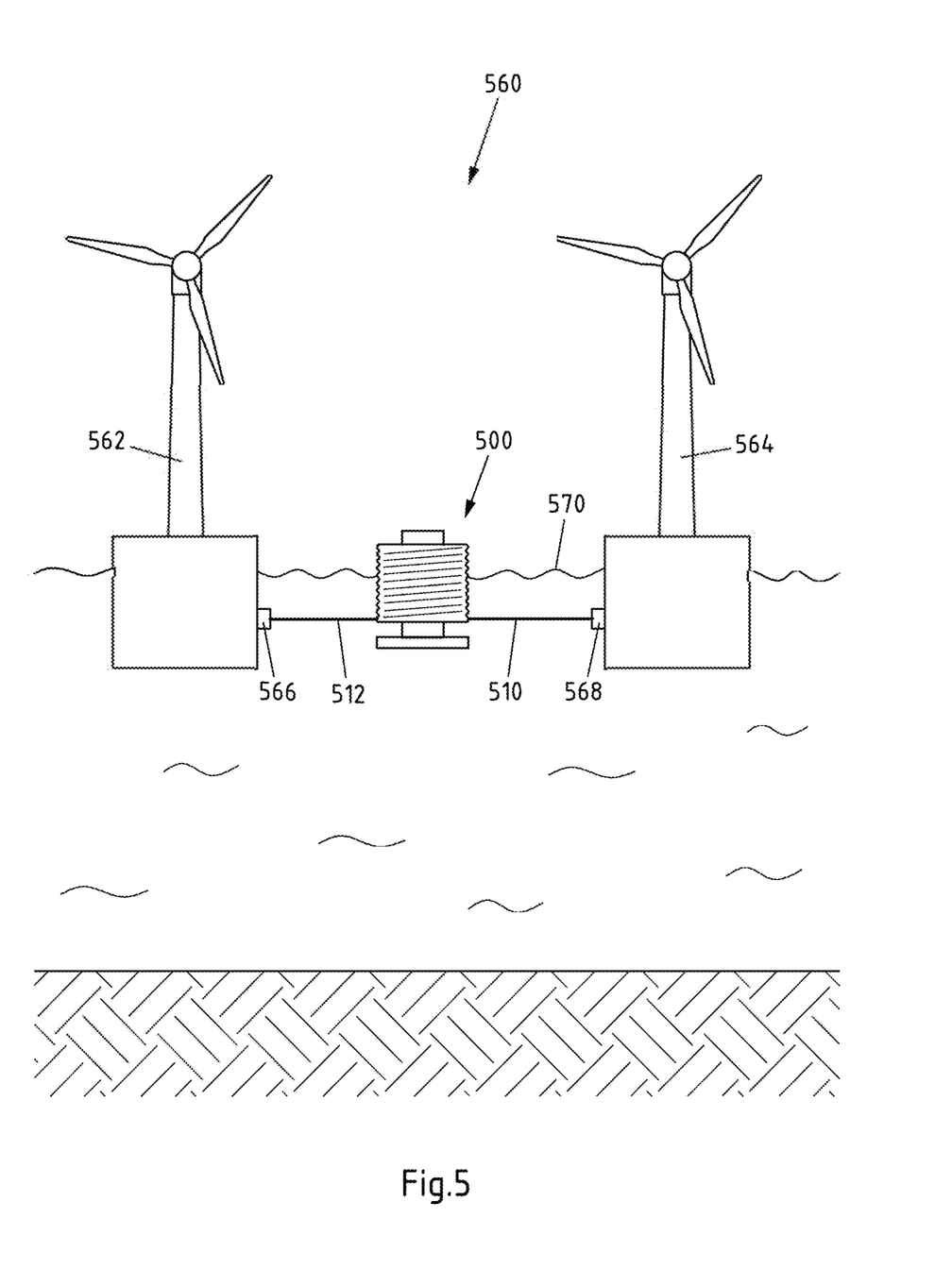

The FIG. 5 shows a schematic view of an embodiment of an offshore wind energy system 560 according to the present application. In particular, the system 560 comprises a power cable arrangement 500, for example corresponding to an arrangement according to any of FIGS. 1 to 4.

In addition to the power cable arrangement 500, the offshore wind energy system 560 in the present application comprises two offshore wind energy devices 562, 564 (e.g., two offshore wind turbines 562, 564). It shall be understood that in other variants of the application, only a single offshore wind energy device may be provided.

The offshore wind energy system 560 is shown in a pre-installed state. In this state, at least a first cable end 510 is mechanically and electrically coupled to a cable connection 568 (e.g., a control cabinet) of the first offshore wind energy device 564. Furthermore, in the present embodiment, the further cable end 512 is mechanically and electrically coupled to a cable connection 566 (e.g., a control cabinet) of the further offshore wind energy device 562. Moreover, in this embodiment, the power cable 508 is wound on the cable drum 504.

As can be further seen, the illustrated elements 500, 562, 564 are floatable. The reference sign 570 denotes the water surface.

In this pre-installed state, the offshore wind energy system 560 can be transported to a specific installation location, for example by a tugboat. There, for example, the first offshore wind energy device 564 may first be anchored. Then, the second offshore wind energy device 562 can be transported to its installation location while simultaneously unwinding the power cable from the cable drum device 502. The installation process can be significantly simplified.

Figure 6:
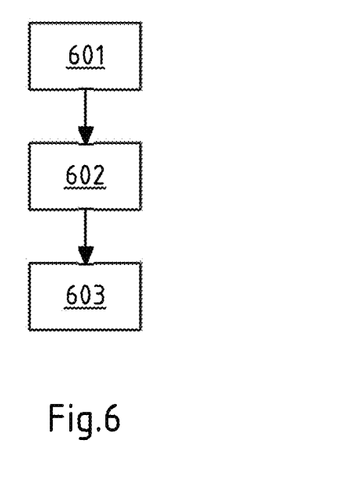

The FIG. 6 shows a diagram of an embodiment of a method according to the present application. For example, the method may be used to manufacture a power cable arrangement according to any of FIGS. 1 to 4.

In the method, in particular in the winding process, a first section of the power cable (of at most two sections) is wound onto the cable drum with a first direction of rotation and winding direction, respectively, in a first winding step 601. The further section of the power cable is wound onto the cable drum with a direction of rotation and winding direction, respectively, opposite to the first direction of rotation in a further winding step 603.

In step 602, a deflecting of the power cable occurs, for example, using a previously described cable deflecting unit. It shall be understood that a part of the first section and/or a part of the further section can run over the cable deflecting unit.

Figure 7:
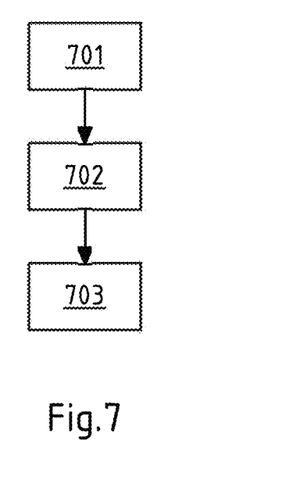

The FIG. 7 shows a diagram of an embodiment of a further method according to the present application. The method may be used for installing an offshore wind energy system, as exemplified shown in FIG. 5.

In a first step 701, a connecting of at least one cable end of a power cable of a previously described power cable arrangement to a cable connection of the at least one offshore wind energy device is performed. In a further step 702, a transporting of the offshore wind energy device together with the power cable arrangement to an installation position of the offshore wind energy device is performed. In a further step 703, an unwinding of the power cable is performed.

In particular, the method comprises a previously described pre-installing of an offshore wind energy device, wherein, for example, in a port, at least one cable end of a power cable of a previously described power cable arrangement is mechanically and electrically coupled to a cable connection of the at least one offshore wind energy device (step 701).

After the pre-installation, the offshore wind energy device together with the (for example floatable power cable arrangement) can be transported, in particular towed, for example, by a ship, to the installation site (step 702).

At the installation site, the power cable may then be unwound in the manner previously described (step 703), and, if the further cable end is not yet connected, in particular, pre-installed at a further wind energy device, the further cable can be connected to a cable connection of a further wind energy device.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power cable arrangement for offshore wind farms, comprising:
    at least one cable drum device with a cable drum, and
    at least one power cable wound on the cable drum and comprising at least one cable end configured to pre-installing on a cable connection of a wind energy device,
    wherein the power cable is wound on the cable drum such that a first section of the power cable is wound inversely to a further section of the power cable; and
    wherein the power cable drum includes at least one cable deflecting unit positioned away from a surface of the cable drum so as to allow overlapping of the at least one power cable wound on the cable drum between the surface of the cable drum and the at least one cable deflecting unit.

2. The power cable arrangement according to claim 1, wherein
    the at least one cable deflecting unit is configured to deflect the power cable during winding onto the cable drum such that the first section of the power cable is windable inversely to the further section of the power cable.

3. The power cable arrangement according to claim 2, wherein
    the cable deflecting unit comprises an arcuate cable guide.

4. The power cable arrangement according to claim 3, wherein
    the arcuate cable guide is a semicircular cable guide.

5. The power cable arrangement according to claim 4, wherein
    the radius of the semicircular cable guide is at least seven times larger than the diameter of the power cable, and/or
    the radius of the semicircular cable guide is at least greater than 50% of the cable drum radius.

6. The power cable arrangement according to claim 5, wherein the radius of the semicircular cable guide is at least greater than 75% of the cable drum radius.

7. The power cable arrangement according to claim 6, wherein the radius of the semicircular cable guide is at least greater than 90% of the cable drum radius.

8. The power cable arrangement according to claim 2, wherein
    the cable deflecting unit is attached to the cable drum device such that an arcuate cable guide runs in a plane parallel to a cable drum axis.

9. The power cable arrangement according to claim 2, wherein
    the cable deflecting unit is attached to the cable drum device by an articulation mechanism,
    wherein the articulation mechanism is movable at least between a first position, in which an arcuate cable guide extends in a plane parallel to a cable drum axis, and a second position in which the arcuate cable guide runs in a plane which has an angle of at least 45° to that of the plane parallel to the cable drum axis.

10. The power cable arrangement according to claim 9 wherein the articulation mechanism is movable at least between a first position, in which the arcuate cable guide extends in the plane parallel to the cable drum axis, and a second position in which the arcuate cable guide runs in the plane which has an angle of at least 75° to that of the plane parallel to the cable drum axis.

11. The power cable arrangement according to claim 10 wherein the articulation mechanism is movable at least between a first position, in which the arcuate cable guide extends in the plane parallel to the cable drum axis, and a second position in which the arcuate cable guide runs in the plane which has an angle of 90° to that of the plane running parallel to the cable drum axis.

12. The power cable arrangement according to claim 1, wherein
    the cable drum comprises a first cable drum section and a second cable drum section, wherein the first and second cable drum sections are freely rotatable relative to each other, and
    the first section of the power cable is wound on the first cable drum section, and
    the second section of the power cable is wound on the second cable drum section.

13. The power cable arrangement according to claim 1, wherein
    the cable drum device is formed as a floatable cable drum device.

14. A wind energy system, comprising:
    at least one wind energy device with at least one cable connection; and
    at least one power cable arrangement according to any one of the preceding claims, wherein a cable end of the power cable of the power cable arrangement is connected to the cable connection.

15. The wind energy system according to claim 14, wherein the wind energy system is an offshore wind energy system.

16. A method of installing an offshore wind farm having at least one offshore wind energy device, comprising:
    connecting at least one cable end of a power cable of a power cable arrangement according to claim 1 to a cable connection of the at least one offshore wind energy device,
    transporting the offshore wind energy device together with the power cable arrangement to an installation position of the offshore wind energy device, and
    unwinding the power cable.

17. The power cable arrangement according to claim 1, wherein the power cable arrangement is a submarine power cable arrangement.

18. A method of manufacturing a power cable arrangement according to claim 1, comprising:

winding a first section of a power cable onto a cable drum in a first direction of rotation in a first winding step, and winding a further section of the power cable onto the cable drum in a direction of rotation opposite to the first direction of rotation in a further winding step which is at least downstream of the first winding step.

19. A cable drum device for a submarine power cable, comprising:

a cable drum; and at least one cable deflecting unit configured to deflect the power cable during winding onto the cable drum such that a first section of the power cable is windable inversely to a further section of the power cable, the cable deflecting unit being positioned in a plane displaced from a surface of the cable drum to allow overlap of the power cable between the surface of the cable drum and the cable deflecting unit.

20. A method of manufacturing a power cable arrangement, comprising:

winding a first section of a power cable onto a cable drum in a first direction of rotation in a first winding step, and winding a further section of the power cable onto the cable drum in a direction of rotation opposite to the first direction of rotation in a further winding step which is at least downstream of the first winding step, and wherein at least one of the steps of winding allows for an overlapping of the first section of the power cable and the second section of the power cable.

21. The method according to claim 20, wherein the method comprises:

guiding the power cable over a cable deflecting unit mounted to the cable drum between the first winding step and the further winding step.

* * * * *